March 15, 1949. J. J. CORTESE 2,464,294
FLUID CURRENT CONFECTION COOLING APPARATUS
Filed March 6, 1945 2 Sheets-Sheet 1
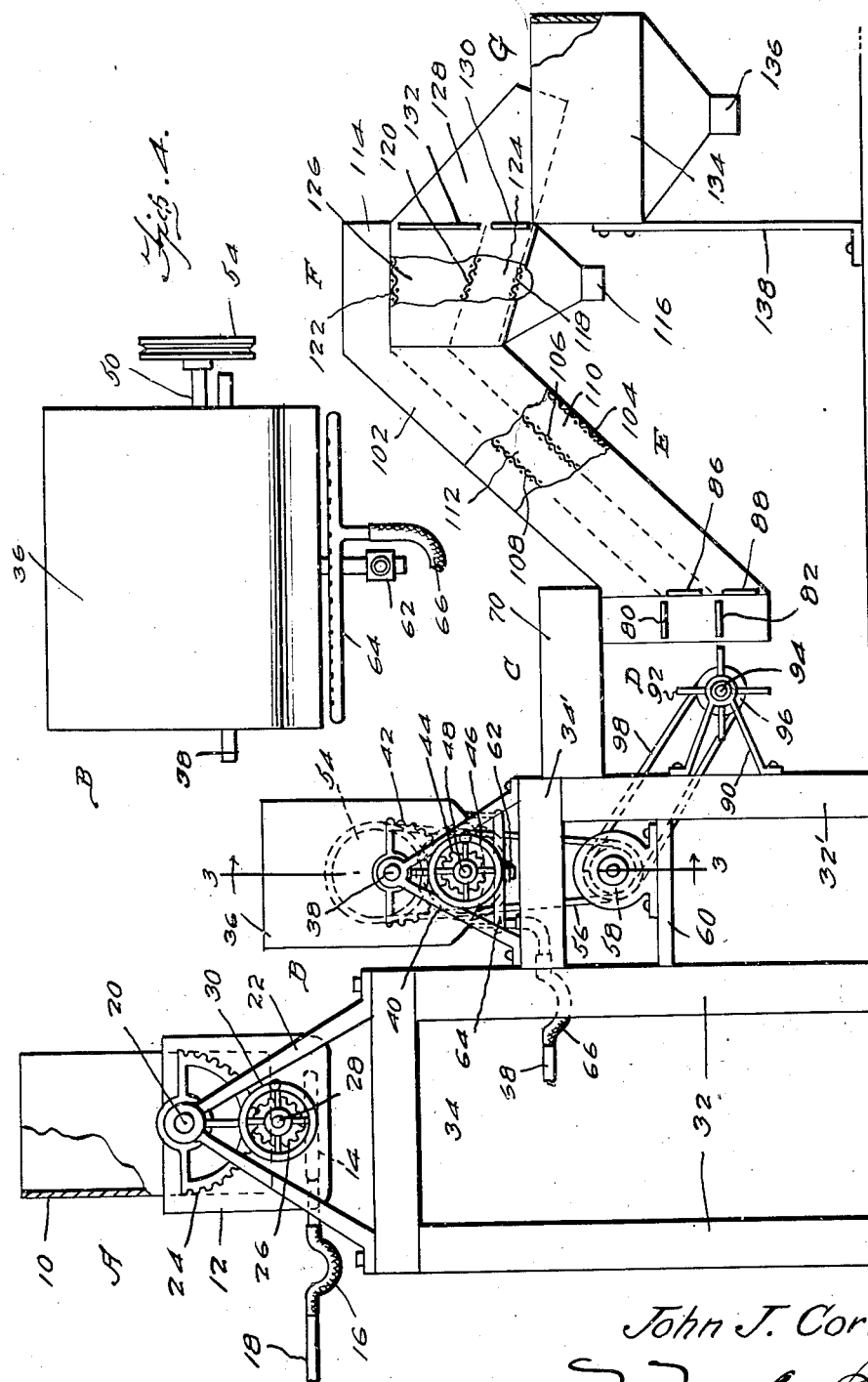
Inventor
John J. Cortese
By McMorrow and Berman
Attorneys March 15, 1949.  J. J. CORTESE  2,464,294
FLUID CURRENT CONFECTION COOLING APPARATUS
Filed March 6, 1945  2 Sheets-Sheet 2
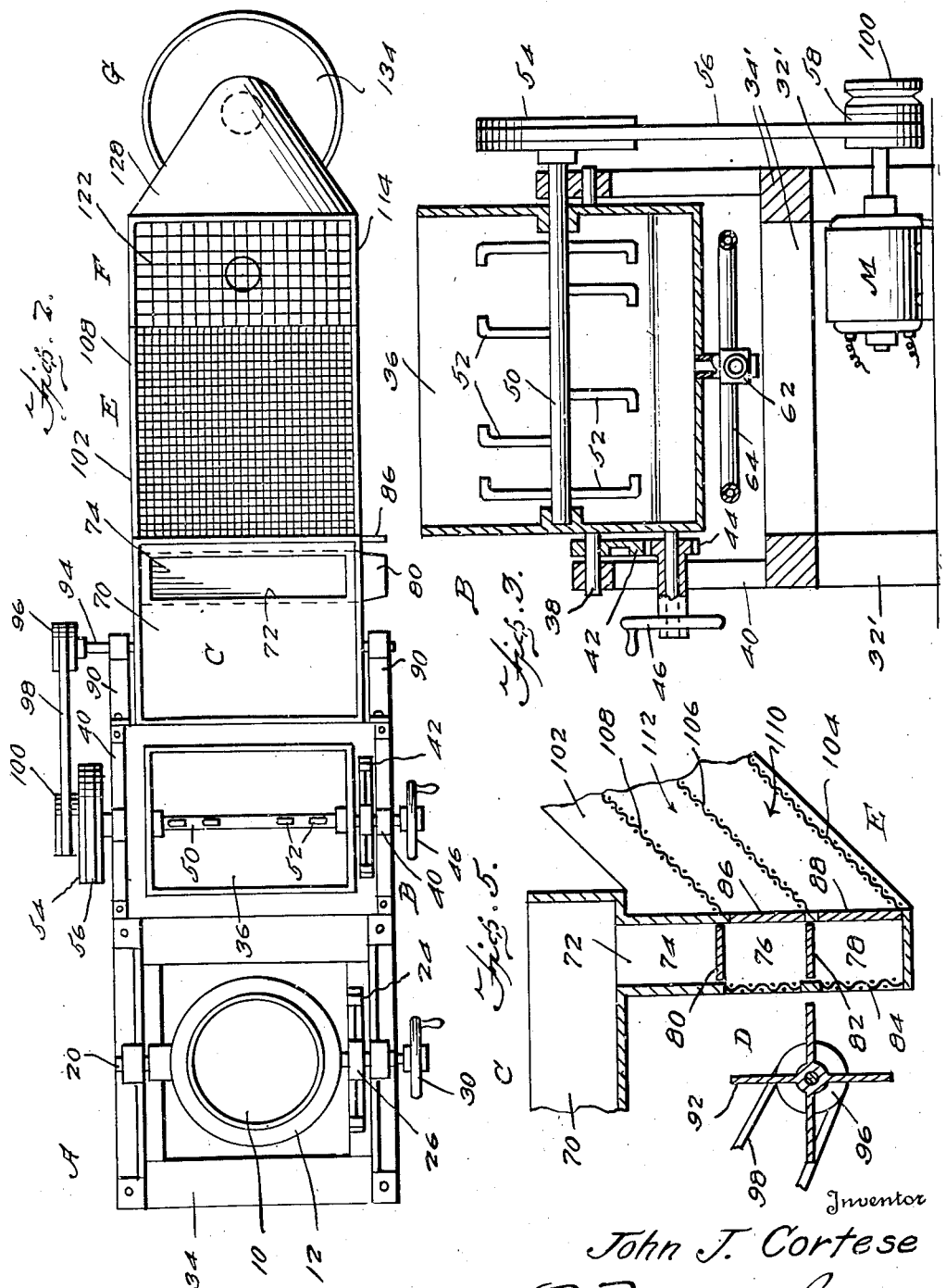
Inventor
John J. Cortese
By McMorrow & Berman
Attorneys Patented Mar. 15, 1949

2,464,294

UNITED STATES PATENT OFFICE 2,464,294

FLUID CURRENT CONFECTION COOLING APPARATUS

John J. Cortese, Denver, Colo.

Application March 6, 1945, Serial No. 581,249

2 Claims. (Cl. 209—3)

This invention appertains to confection making apparatus generally, and has for one of its several objects to provide a type thereof to facilitate the making of certain coated confections, such as caramel and cheese popcorn.

Another object of the invention has to do with the provision of an apparatus of this kind, wherein the several steps involved in the making of caramel or cheese popcorn are performed in a substantially continuous operation, beginning with the heating, i. e., melting down, of the coating material, and ending with the storage of the finished product, ready for dispensing, or packaging.

With these and other objects and advantages in view, the invention resides in the certain new and useful combination, construction, and arrangement of parts, as will be hereinafter more fully described, set forth in the appended claims, and illustrated in the accompanying drawings, in which:

Figure 1 is a side elevation of the apparatus, in accordance with the invention;

Figure 2 is a top plan view;

Figure 3 is a vertical, transverse section, taken through the line 3—3 on Figure 1, looking in the direction of the arrows;

Figure 4 is an enlarged side elevation of the agitator or mixer per se; and

Figure 5 is an enlarged, fragmentary, vertical, sectional detail, showing the construction and arrangement of the connected portions of the separator table and the dryer.

Referring in detail to the drawings, wherein like characters of reference denote corresponding parts in the several views, the invention, as it is exemplified therein, is generally comprised in a starting stage or unit A, for cooking or melting down the coating material, such as caramel, cheese or the like; a stage or unit B, including a mechanical agitating means, for mixing the popcorn kernels with the melted or liquefied coating material, received from the stage or unit A; a stage or unit C for the hand separation of the coated kernels from the sticky mass received from the stage or unit B; a stage or unit D for cooling off the separated coated kernels, received from the stage or unit C; a stage or unit E for completing the drying off of the cooled coated kernels, received from the stage or unit D; a stage or unit F for sorting the dried coated kernels, received from the stage or unit E; and a final stage or unit G for storing the sorted coated kernels, received from the stage or unit F.

The stage or unit A is preferably comprised in a cylindrical kettle or pot 10, welded to the top of a hollow casing 12, containing a heating element 14, which preferably takes the form of a gas burner, having an inlet opening through a wall of the casing and provided with a flexible connection 16, to a supply pipe 18. This kettle and heater assembly is supported on trunnions 20, projecting from opposite sides of the casing 12 and journalled in bearing brackets 22, which are secured on a base made up of vertical timbers 32 and cross timbers 34. Welded on one of the trunnioned sides of the casing 12, is a half-gear 24, in mesh with a whole gear 26, which is mounted, together with a hand wheel 30, on a stub shaft 28, journalled in a central portion of the adjacent of the bearing brackets 22.

The stage or unit B is comprised in a transversely elongated vessel 36, having an open top and a rounded bottom, supported on trunions 38, projecting from its end walls and journalled in bearing brackets 40, secured on the cross timbers 34', of a lower offset part of the base; the cross timbers being supported at one of their ends from the adjacent of the vertical timbers 32 and at their opposite ends on other vertical timbers 32'. Welded on one of the end walls of the vessel 36, is a half-gear 42, in mesh with a whole gear 44, which is mounted, together with a hand wheel 46, on a stub shaft 48, journalled in a central portion of the adjacent of the bearing brackets 40. Extending lengthwise within the vessel 36, is a shaft 50, which has its ends journalled in the end walls thereof and is provided with a plurality of stirrer arms 52. One end of the shaft 50 projects from the end of the vessel, opposite from the position of the hand wheel 46, and carries thereon a pulley 54, which is connected by an endless belt 56 to a pulley 58, keyed on the rotor shaft of an electric motor M; the latter being supported on a shelf 60, mounted on the vertical timbers of the base, beneath the cross timbers 34'. A valved outlet 62 is provided in the center of the bottom wall of the vessel 36, for draining off a wash solution employed in cleaning out the interior of the vessel. Mounted on the bottom wall of the vessel 36, is a gas burner 64, for heating the mixture during its agitation; a flexible connection 66 being extended between the same and a supply pipe 68. The use of this flexible connection 66, as well as the like connection 16, permits of the reqlired tilting movements of the mixing vessel 36 and the kettle 10, respectively, to pouring or discharge positions.

The stage or unit C is constituted in a separator table or tray 70, extending from the outer transverse side of the lower part of the base structure, and it has its bottom wall slotted, as at 72, alongside its outer wall, for the discharge of separated portions of the mixture, dumped into the table from the mixing vessel 36, into the cooling stage or unit D.

The cooling stage or unit D is comprised in a rectangular chamber, depending from the lower side of the table or tray 70, from about the edges of the slot 72. The chamber is divided into an upper compartment 74, an intermediate compartment 76, and a lower compartment 78; the upper compartment 74 being in open communication with the interior of the table or tray 70, through the slot 72, while the intermediate compartment 76 is separated from the upper compartment 74, by a slide 80, and the lower compartment 78 from the intermediate compartment 76, by a similar slide 82. The rear sides of the intermediate and lower compartments 76 and 78 are formed by a one-half inch wire mesh 84, while the front sides of the same are constituted in slides 86 and 88, respectively. Bracketed, as at 90, on the vertical timbers 32', of the lower part of the supporting base structure, is a high speed fan 92, having a pulley 96, keyed on an end of its shaft 94 and in belted connection, as at 98, with a second pulley 100, keyed on the rotor shaft of the motor M.

The drying stage or unit E is comprised in an elongated frame 102, open at its top and bottom sides, with its bottom opening closed by a screen 104, of a fine wire mesh, and other screens 106 and 108, of the same wire mesh, are uniformly spaced above the screen 104, to form passageways 110 and 112 between the same; the passageway 110 leading from the side opening of the lower compartment 78, of the chamber of the cooling stage or unit D, and the passageway 112, from the like opening of the intermediate compartment 76; both of said passageways opening outwardly of the upper end of the frame.

The sorting stage or unit F is constituted in a chamber 114, having the form of a hopper, with a discharge outlet 116 in its sloping bottom. The chamber is supported with the upper end portion of its rear side wall abutted against the elevated end of the dryer frame 102 and has openings therethrough in communication with the passageways 110 and 112, in the latter. Spaced one above the other within the chamber 114, are screens 118 and 120, of a wire mesh corresponding to that forming the rear sides of the chamber of the cooling stage or unit D, i. e., one-half inch mesh. These screens 118 and 120 slope forwardly and downwardly from the lower edges of the openings from the passageways 110 and 112, to form a passageway 124, in continuation with the passageway 110, while another screen 122 is extended horizontally within the chamber 114, from the top edge of the opening of the passageway 112; the space between the same and the screen 120, constituting a passageway 126, in continuation with the passageway 112. These passageways 124 and 126 open through the forward side wall of the chamber 114 and into the upper end of a downwardly sloping chute 128; the openings being normally closed by slides 130 and 132, respectively.

The last stage or unit G is constituted in a hopper 134, of a substantially larger capacity than that of the chamber 114, which is mounted on a vertical support 138, with its open top substantially level with the lower edge of the opening from the passageway 124, in the chamber 114, and the lower end of the chute 128 positioned within the same; the sloping bottom of the hopper having a discharge outlet 136.

In the operation of the apparatus, as thus constructed and arranged, a confection coating substance, such as caramel, cheese or the like, is placed within the kettle 10 and melted down by the heat from the burner 14. While the coating substance is being cooked or melted, as the case may be, popped kernels of corn will be placed within the vessel 36 and, when the coating substance has been reduced to a proper consistency, the kettle 10 will be tilted on its trunnions 20, by a manipulation of the hand wheel 30, and its content allowed to pour into the vessel 36 and over the contained popcorn. With the power of the motor M applied to the agitator shaft 50, at the pulley 54, the contents of the vessel 36 will be thoroughly mixed together, the initial consistency of the coating substance being maintained by the heat from the burner 64, if necessary or desirable. When it is determined that the contents of the vessel 36 have been sufficiently agitated, the vessel is tilted on its trunnions 38, by a manipulation of the hand wheel 46, and the contents dumped onto the table or tray 70. Here, the coated kernels are manually separated one from the other and discharged downwardly through the slot 72, into the upper compartment 74, of the cooling chamber of the stage or unit D, and from thence into the other of the compartments 76 and 78, by the opening of the slides 80 and 82. As the kernels drop from the table or tray 70 into the chamber, they are subjected to the air blast from the fan 92, which is being driven from the motor M; the air passing into the chamber, or its compartments if the slides 80 and 82 are closed, and thereby thoroughly cooling the coatings of the kernels. After being sufficiently cooled, the side slide of one of the compartments 76 and 78, preferably the slide 88 of the lower compartment 78, will be opened, when the kernels from that compartment will be blown by the air blast from the fan 92 upwardly of the lower passageway 110, in the dryer frame 102, for discharge into the sorting chamber 114 and downwardly over the lower screen 118 in the latter. The opening of the slide 88 will be followed by the opening of the slide 86, when the content of the intermediate compartment 76, of the cooling chamber, will likewise be blown from the same and upwardly of the passageway 112, into the sorting chamber 114, and downwardly over the intermediate screen 120 therein. Since the screens 118 and 120 are of the larger mesh, small, and ofttimes un-popped kernels of the corn, will be separated out from the larger kernels, and drop through the screens to gather in the bottom of the chamber 114, whence they may be removed at the discharge outlet 116. In passing through the passageways 110 and 112, over the screens 104 and 106, the coated kernels are further aerated to a thoroughly dried condition of the coatings thereon. By opening the slides 130 and 132, in the forward side wall of the sorting chamber 114, the sized kernels pass downwardly of the chute and collect in the hopper 134, whence they may be dispensed or bagged, at the discharge outlet 136.

Without further description, it is thought that the invention in its disclosed embodiment will be clearly comprehended and its simplicity in construction and operation will be greatly appreciated by those engaged in the business of manufacturing confections of the kind specified, especially since the arrangement of the stages or units is one of compactness and convenience, requiring the services of but one attendant per run of the apparatus.

Having thus fully described my invention, it is to be understood that changes in design and in minor details of construction and arrangements of parts may be resorted to, within the limits defined by the scope of the appended claims.

What I claim is:

1. In an apparatus of the class described, a cooling chamber, a drying frame inclining forwardly from the forward side of said cooling chamber and having an open top and bottom, screens of a fine wire mesh extending longitudinally along said frame and vertically spaced apart to form forwardly inclined passageways therebetween, said cooling chamber having vertically separated compartments each having a forward opening communicating with a corresponding one of said passageways, slides normally separating said compartments from each other, other slides normally closing said forward openings of said compartments, a sorting chamber supported at the elevated forward end of said dryer frame with said passageways opening into said sorting chamber, wide mesh screens spaced one above the other within said sorting chamber, the lower of said wide mesh screens declining forwardly from the openings of said forwardly inclined passageways and forming declining passageways in continuation of said forwardly inclined passageways, said declining passageways terminating in openings in the forward wall of said sorting chamber, slides normally closing the last mentioned openings, a storage hopper positioned forwardly of and below said sorting chamber, a chute leading from the last mentioned openings into said hopper, and a discharge outlet in the bottom of said hopper.

2. Cooling apparatus, comprising a series of superimposed chambers, horizontally sliding panels movable to provide communication from one chamber to another, an upwardly inclined duct leading from each chamber, vertically extending panels between each chamber and its complementary duct, means for moving the said vertically extending panels to provide communication between each chamber and its complementary duct, and means arranged to pass a cooling fluid transversely through each chamber and through its complementary duct.

JOHN J. CORTESE.

REFERENCES CITED

The following references are of record in the file of this patent:

UNITED STATES PATENTS

| Number | Name | Date |
|---|---|---|
| 277,686 | Cutler | May 15, 1883 |
| 849,225 | Gans | Apr. 2, 1907 |
| 879,715 | Adams | Feb. 18, 1908 |
| 1,359,301 | Wettig | Nov. 16, 1920 |
| 1,552,293 | Gardner et al. | Sept. 1, 1925 |
| 1,706,708 | Robb | Mar. 26, 1929 |
| 1,917,483 | Armimoto | July 11, 1933 |
| 1,998,210 | Underwood | Apr. 16, 1935 |
| 2,023,741 | Moir | Dec. 10, 1935 |
| 2,041,591 | Brown et al. | May 19, 1936 |
| 2,068,326 | Horberg | Jan. 19, 1937 |
| 2,106,893 | Krein | Feb. 1, 1938 |
| 2,123,215 | Thomas | July 12, 1938 |
| 2,127,256 | Herrin | Aug. 16, 1938 |
| 2,198,152 | Cooley et al. | Apr. 23, 1940 |
| 2,231,342 | Loyless | Feb. 11, 1941 |
| 2,352,839 | Johnston et al. | July 4, 1944 |
| 2,418,190 | Overland | Apr. 1, 1947 |